July 19, 1966
W. M. HALPER ETAL
3,261,792
PREPARATION OF LATICES
Filed Sept. 19, 1962
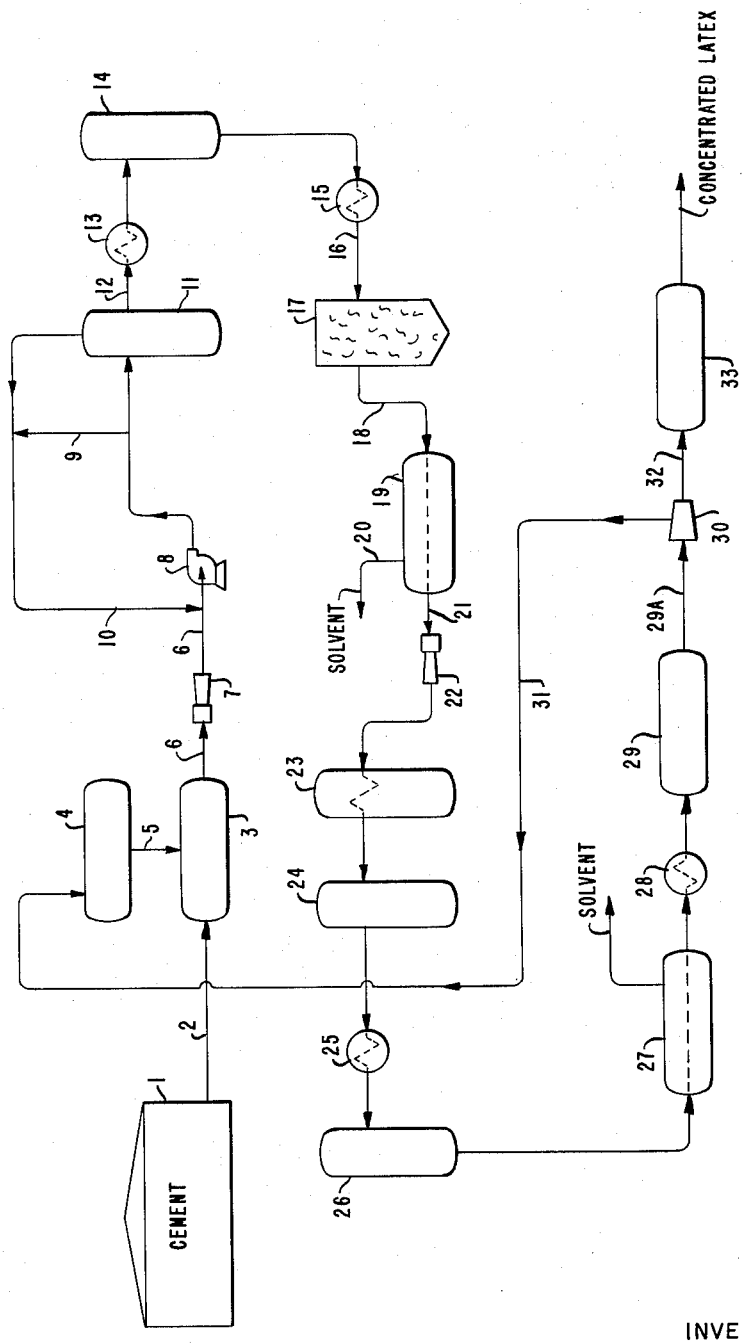
INVENTORS:
WALTER M. HALPER
F. DUDLEY MOSS
BY: *William H. Myers*
THEIR AGENT

United States Patent Office 3,261,792
Patented July 19, 1966

3,261,792
PREPARATION OF LATICES
Walter M. Halper, San Pedro, and Fred Dudley Moss, Long Beach, Calif., assignors to Shell Oil Company, New York, N.Y., a corporation of Delaware
Filed Sept. 19, 1962, Ser. No. 224,677
3 Claims. (Cl. 260—23.7)

This invention is related to the process for producing latices of rubbers. More particularly, it relates to an improved process for producing latices of elastomers from organic solvent solutions thereof.

The art and technology relating to latices of synthetic polymers is highly developed. In the prior art, synthetic elastomers and other polymers are commonly prepared by emulsion polymerization techniques whereby the resulting product at the end of the polymerization is a suspension wherein the solids content varies depending upon the particular art and technology involved. Thus, for example, synthetic elastomers of the type represented by styrene-butadiene copolymers are suitably prepared by emulsion polymerization in the presence of water and emulsifying agents so that the resulting product is an aqueous suspension of the copolymer together with the unreacted monomers.

In such emulsion polymerization process, the copolymer ultimately may be separated upon the addition of precipitants such as salt and acid, whereupon a crumb of the rubber is obtained which is easily separated from the aqueous phase. Synthetic latex, as distinguished from crumb, is highly useful in the production of foam rubber or cellular products. The latex usually is obtained from the emulsion by flashing to remove the unreacted monomer and some water, the resulting product being latex.

In many instances, the preparation of latex from particular rubbers by flashing procedures results in great difficulties relative to excessive foaming of the products involved, especially if substantial amounts of solvents or monomers must be removed. The foam appears to be accentuated as the temperature is raised in an effort to flash off hydrocarbon constituents, the solvent vapors being initimately mixed with evolving vapors to such an extent that a froth or foam is formed which has been found to be difficult in many cases to resolve and which clogs vapor recovery apparatus.

In recent years, synthetic elastomers produced by solution polymerization methods have received much attention mainly due to advances and changes in elastomer technology. The problems of emulsifying the cements so produced to make latices therefrom have created difficulties not heretofore experienced because material differences exists not only within the elastomers per se but in addition the solutions of these elastomers have different rheological properties and characteristics from those of prior products. The presence of large amounts of solvent and the requirement for relatively large proportions of emulsifying agents (compared with the requirements of an emulsion polymerization process) compound the foaming problem. It would be highly desirable to devise a process for the conversion of synthetic polymer (elastomer) cements into latex form without encountering the difficulties briefly referred to hereinbefore. It would be especially desirable to devise a process which would minimize or eliminate the problems usually connected with undue foaming of the product and, more specifically to take advantage of the necessity for flashing off the solvent in such a manner as to cause stable foam formation.

A recent process for converting latices comprises the formation of foam of the emulsified cement wherein the foaming agent is polymer solvents and the liquid phase of the foam is rubber latex. This foam is then collapsed either by cooling or by application of pressure to form two principle phases, namely, a liquid polymer solvent phase and a separated aqueous polymer latex phase.

One problem encountered in this process is concerned with the redispersal of polymer solvents back into the aqueous phase and vice versa which inherently occur in the normal handling of the compositions during foaming and foam collapse. This results in a co-called "slime" which comprises a continuous solvent phase within which is suspended droplets of water contained partially stripped particles of rubber, the swollen character of the rubber particle being due to an excessive amount of solvent containing therein. This is distinguished from the other major component of the collapsed foam which comprises the desired rubber latex wherein the continuous phase is water having colloidally dissolved therein an emulsifying agent and colloidally dispersed therein particles of rubber which are not unduly swollen even though they may contain minor amounts of residual solvent. The problem then is to find a means for resolving the "slime" so as to recover the components contained therein and to prevent contamination of the treating equipment with the slime components, particularly the rubber particles.

Now, in accordance with the present invention, a process for the production of a latex of a synthetic hydrocarbon elastomer comprises mixing water, a cement of the elastomer in an organic solvent therefore said solvent having no more than a low solubility in water, with an emulsifying agent, treating the mixture so formed to create an emulsion, and then foaming the emulsion by causing vaporization, then condensing the foam to form a separate major liquid solvent phase, an aqueous latex of colloidally dispersed rubber particles, and an undesirable slime as hereinbefore described, passing the slime through a coalescer so as to largely resolve the components thereof into a separate solvent phase and a latex phase and separately recovering rubber solvent and rubber latex.

Two principle means are utilized for treating the slime insofar as sequence of processing steps is concerned. In the first variation of this process, the mixture emerging from the foam condenser (collapser) is conducted to a coalescing zone wherein all of the components contained in the collapsed foam are passed there through for the purpose of resolving the slime as described hereinabove. The second variation comprises passing the body of the condensed foam components to a settling decanter, permitting the phases to separate into a liquid rubber solvent phase the aforesaid slime and a rubber latex phase. After settling has occurred sufficiently, the latex is separated from the slime and solvent, and the latter two phases are then passed through the coalescer for reduction of the slime. Thirdly, of course, the phases may be more fully divided in separating both rubber latex and rubber solvent phases from the slime which then constitutes the major component sent to the coalescer. The second of these three alternatives is preferred.

The action of the coalescer in this particular process is unusual in that it constitutes a means for separating one phase of a complicated three-component mixture without disturbing the other two compound phases.

THE POLYMERS

The process of this invention is applied to any hydrocarbon polymer that is in the form of a cement before being emulsified. It is immaterial how the cement of the polymer is obtained. Preferably, the polymer is a synthetic elastomer and still more preferably, a rubbery polymer (including copolymers) of conjugated dienes.

The solvent utilized in forming the cement (polymer solution) must be no more than a limited water solubility, e.g., less than 5 cc. per liter of water at 20° C., while solvents having boiling points higher than that of water, e.g., toluene, may be used, it is preferred to use one boiling below the boiling point of water under the conditions existing during solvent removal. The preferred classes of solvents comprises those boiling at least 40° C. below the boiling point of water under a given set of conditions, i.e., pressure. Still more particularly, the solvents considered most suitable for use in the latex forming process of this invention comprise hydrocarbons which are solvents for the rubbers employed and have a solubility of 0.5–5 cc. in water at 20° C.

In the more preferred embodiments, the process of the invention is applied to synthetic elastomers prepared by solution polymerization methods wherein an organic diluent is used as a combined solvent and diluent.

Butadiene and isoprene are representatives of conjugated dienes which are polymerized by solution polymerization utilizing the so called "low pressure" polymerization methods wherein the polymerization catalyst may be the reaction product of a halide of a transition metal within Groups IV–VIII of the Periodic Table and a reducing agent such as an aluminum alkyl, aluminum alkyl halide aluminum hydride and the like. Lithium alkyls, alone or in combination with lithium metal are also suitable polymeriztion catalysts for conjugated dienes. Thus, polybutadiene or polyisoprene having a cis 1,4-content as high as about 95% may be obtained while by other methods polymers having a high trans 1,4-content may be prepared if so desired.

Another class of synthetic polymers comprise the copolymers prepared from ethylene and one or more monoolefins having up to 8 carbon atoms and ter-polymers having a diene in a minor proportion. Suitable copolymers include especially the copolymers of ethylene and propylene whch may be either elastomeric or plastic depending upon the relative proportions of ethylene and propylene and the copolymers of ethylene with butene-1 and the like. Elastomeric ter-polymers prepared by solution polymerization are also equally suitable for the purposes of the present invention, such as the ter-polymer obtained by the combination of ethylene, propylene and a diene such as 1,5-hexadiene, cyclopentadiene, dicyclopentadiene or cycloheptadiene, prepared by polymerization of a mixture of monomers with a catalyst which may be the reaction product of a reducing agent of the kind indicated above and an vanadium compound such as vanadium halides, vanadium oxy halides, vanadium esters and the like. The usual solvent employed for these polymerizations and suitable for use in present process include hydrocarbons having from 4 to 9 carbon atoms each and preferably from 5 to 7 carbon atoms each including butanes, pentanes, hexanes, butylenes, amylenes, benzene, toluene, halogenated derivatives thereof and other relatively inactive diluents and solvents known in the art.

Persons skilled in the art will understand that these elastomers comprise those that are of relatively recent origin. The elastomer solutions are characterized by being very high in viscosity even at low elastomeric polymer content. Thus, the solids content of the elastomer solution at the end of the polymerization rarely exceeds 30% w. and in fact at such concentrations, great material handling problems are presented so that the solutions usually contain in the order of 5–20% by weight of the elastomer.

When the cement is emulsified, the solid content is preferably substantially less than if it is to be processed to form a crumb. The invention, however, is not critically limited to elastomers prepared by the low pressure processes and any hydrocarbon elastomers produced by solution processes may also be treated by the process of the present invention. Alternatively, elastomers that are in solid form or in latex suspension may be dissolved or redissolved after preparation by other means. When used within this specification, the term "synthetic elastomer" makes reference to synthetic elastomers defined according to ASTM special technical publication No. 184, page 138, wherein elastomer is further characterized in being essentially completely soluble in an organic solvent.

THE EMULSIFICATION

The emulsification of the polymer solution comprises bringing together water, an emulsifying agent and the polymer cement. The apparatus which has been employed for emulsification should be designed for the purpose of homogenizing such mixtures for the production of emulsions. In this regard, a centrifugal pump with a variable speed control and/or a bypass is found to be suitable although other homogenizing equipment may be used in place thereof.

It will be found that the maximum throughput rate in a given piece of apparatus may be substantially increased if the concentration of the polymer in the organic solvent is restricted so as to utilize an optimum viscosity which will vary depending upon the particular apparatus and the particular polymer employed. The viscosity is not only dependent upon the concentration of the polymer in its cement but also upon the average molecular weight of the polymer contained therein. Taking as an example, cis 1,4-polyisoprene soltuion in an aliphatic diluent such as isopentane or isoamylene, suitable throughput rates are experienced at concentrations in the order of 10–20%, although much faster throughput rates may be experienced if the concentration is maintained in the order of 7–10% by weight, the intrinsic viscosity of the polymer contained in the cement being between about 4 and 14 dl./g.

The amount of emulsifying agents and of water emulsified together with the polymer cement depends on such factors as the particular synthetic elastomer being emulsified or upon the particular non-elastomeric polymer present. The proportion will also vary depending upon the emulsification apparatus, the identity of the emulsifying agent, the concentration of the elastomer solution and other variables including temperature. It should be emphasized that the proportion of emulsifying agent utilized at this point in the process is not necessarily the concentration of emulsifying agent which will remain in the latex eventually produced after the claimed process. Generally, the minimum amount of emulsifying agent needed for emulsification ranges from about 2 to 30 parts per 100 of polymer (phr.), but the amount that is contained in the most preferred concentrated latex is usually lower than the 30 parts specified above and will vary depending upon the particular elastomeric latex that is being prepared. Amounts from about 1 to about 3 phr. usually are optimum.

Any of the emulsifying agents employed in the emulsion polymerization art may be suitably employed for the purposes of the present invention. Preferably, the emulsifying agents are soaps and particularly alkali metal soaps of monocarboxylic acids. The sodium or potassium soaps of rosin acids are especially preferred although mixed soaps such as the soaps of tall oil acids, saturated or unsaturated fatty acids such as oleic, palmitic, stearic, lauric, myristic, castor oil acids and similar acids may be employed in the preparation of suitable emulsifying soaps.

In addition to, or in place of, the soap emulsifying agents, other emulsifiers may be utilized including cationic or non-ionic water-dispersable emulsifiers particularly the amine salts of hydroxyl amines and long chain fatty acid esters as well as quaternary ammonium salts such as tridecyl benzene, hydroxy ethyl imidazoline chloride and stearyl dimethyl benzyl ammonium chloride and the like. Non-ionic surfactants which may be utilized for this purpose are represented by phosphoric acid esters of higher alcohols such as capril and octyl alcohols, monoesters of oleic acid with pentaerythritol, sorbatan monoaleate and the like.

The emulsifying agent is preferably added to the mixture being prepared for emulsification in the form of an aqueous solution or dispersion and desirably is in concentrations in the order of 0.5–2% based on the eventual aqueous phase of the emulsion. The amount of water contained in the total composition for emulsification will normally range from about 40 to about 300 parts per hundred parts by volume of elastomer solution, with amounts in the order of 50–100 being preferable.

It will be readily appreciated that the emulsification procedures may be varied within the knowledge of the art. Thus, the emulsifying agent may be prepared in situ by adding the soap forming acid to the elastomer solution and adding an alkali metal hydroxide and soap forming acid occurs during emulsification. If desired, all of the ingredients that are to be emulsified may be charged to a single vessel under constant agitation and the blend may then be continuously fed to an emulsifying apparatus. Alternatively, water, solution of emulsifying agent and elastomer solution (cement) may be fed by separate inlets into the emulsifying apparatus in the desired proportions and the resulting aqueous emulsion recovered and stored for subsequent processing.

The proportion of emulsifying agent is adjusted for the purpose of forming a relatively stable emulsion under the conditions and time period required for latex formation and moreover must be adjusted to the point where transfer of the rubber from its organic solvent solution into colloidal suspension in the aqueous phase may be easily accomplished. Emulsions that are not stable are characterized by two layers and will result in latices of uneven quality, with large globules of undispersed cement distributed more or less irregularly throughout the latex.

As previously indicated, the aqueous emulsion of the synthetic polymer should be sufficiently stable in order to produce a desirable latex. Emulsions which are not stable are characterized by at least partial separation of the emulsion into two layers. The stability of the emulsion depends largely upon the average particle size of the polymer phase and this size is most simply controlled by adjusting the concentration and type of the emulsifier in the aqueous phase in relation to the polymer-solvent phase. The particle size also may be decreased by reducing the throughput rate through the emulsification apparatus and/or increasing the degree of external recycle around the homogenizing apparatus. These measures may be undertaken alone or in combinations of varying the amount of emulsifying agent and the concentration of the polymer solution. The resulting product from the emulsification step should contain in the order of 3–15% by weight of solids depending on the amount of water used, the amount in the order of 5–10% being preferred for reasons of overall efficiency, economy and optimum technical properties.

FOAMING OPERATION

The emulsion so formed is then in condition for the preparation of foam in accordance with the present invention. The foaming operation is accomplished by one of two alternatives or combinations thereof. The solvent for the polymer (hereinafter referred to as the rubber) has a low solubility in water, as referred to hereinbefore. In order for the foaming operation to be accomplished with an optimum degree, it is preferred (but not essential) that the solvents have a boiling point lower than about 40° C. below that of water. The reason for this will become apparent during the description of the foaming operation.

Foaming is accomplished by either heating the emulsion sufficiently to vaporize at least a substantial proportion of the rubber solvent without vaporizing all of the water or, on the other hand, the foaming may be accomplished by preheating and reduction in pressure until the same type of foaming is accomplished. It is to be emphasized that the foaming operation is carried out with the end result of vaporizing the rubber solvent without causing any substantial degree of massive escape of the solvent from the foam. In other words, the foaming operation is not considered to be a fractional distillation or flashing in any sense. It is on the contrary, the creation of gaseous bubbles throughout the heated or depressurized emulsion is sufficient to cause the formation of a foam resembling shaving cream or froth, thus constituting extremely intimate mixtures of vaporized solvents dispersed throughout the liquid phase, the liquid phase comprising the aqueous dispersion of colloidal rubber particles and a colloidal solution of the emulsifying agent. The particular piece of apparatus utilized for accomplishing this step is not critical. This is best accomplished by employing a heat exchanger tube bundle wherein the emulsion passes either inside or outside the tubes surrounded by a heat exchange medium of any desired description or by employing direct steam addition to the emulsion in a suitable vessel.

The heating should be accomplished under conditions which will permit relatively uniform heat transfer throughout the foam as it is formed or shortly thereafter and prior to foam collapse. The reason for this is to effect uniformity of the entire product, so as to minimize the formation of zones throughout the product having variable amounts of solvent remaining therein.

In accordance with the present invention the creation of a foam of substantially the entire body of the emulsion followed by collapse of the foam results in the separation of solvent phase and aqueous latex phase. The precise temperature at which each of these is to be accomplished will depend upon a number of factors readily determined such as the pressure, identity of solvent, efficiency of heat transfer apparatus, etc.

FOAM COLLAPSE

Having created the foam for the purpose of separating the rubber solvent from colloidal rubber particles, the next stage in the process comprises collapsing the foam prior to separation of the phases. This may be accomplished either by increasing the pressure on the system sufficiently to liquify the solvent vapors or by cooling the foam to an extent sufficient to obtain this same result. Of course, combinations of these two alternatives may be utilized. As intimated, hereinbefore, the foam collapse is preferably accomplished with a minimum of agitation preferably by passage through a heat exchange bundle designed particularly for this purpose in having a relatively large number of tubes with relatively short lengths. Minimum turbulence is achieved when the foam passes through the shell of the exchanger, the cooling medium being sent through the tubes thereof. Cooling or pressure are designed to be sufficient for reducing the vaporized solvent to a liquid state but insufficient to solidify either the solvent or the aqueous phase. In other words, the foam collapse is accomplished under such conditions that the major phases comprise liquid solvent, liquid water, and colloidal dispersants of emulsifying agents and of rubber particles. The purpose of minimum agitation during foam collapse is to minimize the reincorporation of separated rubber solvent back into the aqueous phase.

SOLVENT REMOVAL

The collapsed foam mixture comprises a relatively intimate mixture of which the major separate components are two immiscible phases, namely, organic solvent on the one hand and aqueous latex on the other. However, as discussed hereinbefore, due to unavoidable agitation during the various preceeding steps of the process, there is usually an unresolved phase referred to above as "slime." As stated thereinabove, the slime appears to be a continuous solvent phase in which is distributed in apparently colloidal suspension drops of water containing the emulsifier in each of which drops still smaller colloidal particles of swollen rubber are suspended. The swollen nature of the rubber is apparently due to the undesirably high residual solvent content which as far as can be determined is in excess of about 45 phr. based on the rubber and up to about 100 phr. Ordinary gravity settling cannot effect any satisfactory resolution of this "slime." The present invention therefore consists in its essential aspect in the coalsecence of this slime to separate its essential components, namely, the solvent on the one hand and rubber latex on the other. This is effected by passing the slime through a coalescer which may be either of the impingement type (which is preferred) or of the electrical type. Suitable impingement type coalescers include particularly those packed with steel wool, steel filings, glass wool, York matting and the like. For example alternate transverse layers of knitted stainless steel wire mesh of a herring bone type and/or vinyl coated fiber glass with a density of 3–20 pounds per cubic foot are suitable. Typical electrostatic coalescers which may be employed utilize charges of from 10,000 to 100,000 volts, preferably 30,000 to 60,000 volts of extremely low amperage in the general range of 1–5 milliamps. The so-called York matting comprises a mat of tangled wire having an open volume of 60–90% and a density between about 3 and 15 pounds per cubic foot, depending on how much they are compressed.

The resolution of slime by contact with a coalescer may be effected under three differing sets of circumstances as outlined hereinbefore. First, the entire mixture of components resulting from foam condensation can be passed through the coalescer under such conditions that essentially all of the components are in a liquid state (regarding for the purpose of handling that colloidal suspensions of rubber particles are "liquid"). In this case, the mixture after passage through the coalescer is sent to a stratification zone which may also be regarded as a decanter. Passage through the coalescer will effect a sharper separation between rubber solvent phase and latex phase after a limited residence time in the decanter, the solvent phase and latex phase may be separately withdrawn therefrom.

Secondly, the contact with coalescer may be effected subsequent to this initial phase separation, the slime associating more generally with the rubber solvent phase. Consequently, the solvent and slime are withdrawn together and both passed through the coalescer after which the effluent from the coalescer is settled if necessary to cause phase separation of the solvent phase from latex or latex-like components which are separated by the action of the coalescer. Finally, the slime phase may be the sole component of the condensed foam which is treated through the coalescer, the rubber solvent phase and the latex phase being present only as minor components of the coalescer feed.

RESIDUAL SOLVENT REMOVAL

The latex recovered from the solvent separation step normally comprises a major proportion of water containing substantial amounts of emulsifying agent and a colloidally dispersed minor proportion of the polymer (rubber). Furthermore, there usually will be present a minor residual amount of the solvent which was not removed from the system by the steps previously described. While it is highly desirable to remove this residual solvent, it may at this particular point serve a useful purpose in the optional concentration of the latex. Since the specific gravity of the organic solvents are substantially less than that of water, and therefore, the combination of rubber with residual solvent constitutes a phase of lower specific gravity than that of water, it is possible to efficiently centrifuge the latex to remove a substantial portion of the aqueous soap phase and recover a concentrated latex. This is desirable with respect to the efficiency of the steps to be described hereinafter since a large proportion of the aqueous emulsifier phase must or should be removed at some later stage in the latex forming process and moreover may improve the efficiency of residual solvent removal now to be accomplished.

While residual solvent may be removed by flashing techniques, it is preferable to repeat foam formation and foam collapse followed by decanting of the resulting separate phases. The conditions for foam removal and collapse are substantially those described hereinbefore for the initial utilization of these two processing steps. Likewise, the coalescence and removal aspects (decanting) are essentially those previously described.

LATEX CONCENTRATION

The latex derived as described above now comprises an excessively large aqueous emulsifier phase having polymer particles colloidally dispersed therein either with or without minor residual portions of solvent. A second decanting step may be accomplished after heting the latex sufficiently to promote further phase separation of any residual solvent, although this step is not essential. The latex can be concentrated by passing it through a centrifuge whereby a major proportion of the aqueous emulsifier phase is removed and separated from a concentrated latex phase which now may contain upwards of 50% by weight of colloidally dispersed polymer (rubber) together with the remaining portion of the aqueous emulsifier phase. The conditions of centrifuging are controlled to accomplish the degree of separation desired and will depend in part upon the precise concentration of the several components referred to here as well as the toleration of the emulsification agent in the final latex end use. Still further solvent removal may be accomplished by passing the concentrated latex through flashing drums or strippers and optionally the latex may be subjected to a second or further centrifuging operation or operations to remove still further portions of the aqueous emulsifier phase referred to as "serum."

CONCENTRATED LATEX

The solids content of the latex is of considerable importance when the latex is to be used for the preparation of dipped goods and vulcanized foam. When the latex is to be employed as an intermediate for the recovery of rubber by coagulation, the solids content and content of emulsifying agent are of decreasing importance. The required solids content of the concentrated latex will vary depending on such factors and the elastomer species, the species of the emulsifying agents and the ultimate utility. Generally, the solids content of the latex should be in excess of 50% by weight, preferably 55–75% by weight being specifically determined in each case. For cis 1,4-polyisoprene latex, it is most preferred that the solids content be in excess of about 60% and generally between 65 and 70%. For cis 1,4-polybutadiene the solids content may be considerably less and still be acceptable, but in no case should the solids content be below about 50% by weight, when the latex is to be used for the preparation of vulcanized foams or dipped goods.

The process of the invention will be described with particular reference to the figure. A cis 1,4-polyisoprene cement containing 10% by weight of polyisoprene, the solvent being mixed amylenes, is taken from a source 1 through line 2 to a blend and surge tnak 3 wherein it is mixed with an approximately equal amount of a water solution containing 1.5% by weight basis water potassium rosinate, from a source 4 via line 5. The mixture from blend tank 3 is then passed by means of line 6 and inductor 7 to an emulsification device 8 which is operated at an exit temperature of about 135° F. The emulsion is recycled by means of lines 9 and 10 to the emulsification device. Preferably, the emulsified mixture is then passed to the holding tank 11 wherein a recycle of about 1–5% of the emulsified material is passed back into line 10. This proportion is recycled so as to insure complete emulsification of any minor amount of the emulsification mixture not previously fully emulsified.

The finished emulsion is then passed by means of line 12 to the heat exchange bundle 13 comprising the foam forming unit which is operated at about 170–200° F. under 15 p.s.i.g. In this unit, the material which exits comprises a foam of shaving cream consistency which is passed to the time tank 14 for a residence period usually less than about 1 minute in order to enable the solvent to reach its equilibrium concentration relative to the polymer. The product then proceeds to the foam condenser 15 wherein the foam is chilled to about 110° F. at 10 p.s.i.g., thus causing a collapse of the foam due to condensation of the vaporized solvent to a liquid state. The condensed foam passes by means of line 16 through coalescer 17 which is packed with steel wool for the purpose of further resolving the separate phases of solvent and latex.

The coalesced and condensed material then passes by means of line 18 to a decanter 19 wherein it is stored for a sufficient time at about 110° F. and 10 p.s.i.g. to cause substantial settling of the phases, the solvent rising to the top and being removed by means of line 20. The lower layer, comprising a concentrated emulsion comprising largely a latex with minor proportions of residual solvent is optionally passed by means of line 21 to centrifuge 22. Any serum comprising water and emulsifying agent removed thereby may be recycled by a line (not shown) to the emulsification zone of the process.

The concentrated mixture now conntains a minor but substantial amount of residual solvent which is preferably removed by subjecting it to foam formation and collapse as hereinbefore described, in units 23, 24 and 25 comprising the foam former 23, time tank 24 and foam condenser 25 and thereafter passed through a set of apparatus comprising the coalescer 26 and decanter 27. The purposes and results of each of the units are substantially identical with the corresponding pieces of apparatus described hereinbefore.

The bottom layer from the decanter 27 after removal of the top layer solvent comprises a latex containing a reduced but still substantial amount of solvent which is preferably removed at least in part by passage through a heater 28 to raise the temperature to about 180° F., the heated latex being then sent to a flasher 29 for further removal of solvent which separates. The dilute latex is now sent by means of line 29A to a centrifuge 30 for still further removal of serum (water and emulsifying agent) which is recycled by means of line 31 to the serum tank 4.

The concentrated latex still contains traces of solvent which are removed by sending the concentrate by means of line 32 to flashing zone 33, the final product then being a concentrated latex containing less than about 1% solvent based on the rubber and the product comprising about 65% colloidally dispersed rubber with 35% water containing about 0.35% by weight of potassium rosinate based on the water phase.

We claim as our invention:

1. In the process for the production of a rubber latex wherein a cement comprising 5–20% by weight of a rubbery polymer of a conjugated diene dissolved in a hydrocarbon solvent having from 4 to 9 carbon atoms per molecule, said solvent having a maximum boiling point below the decomposition temperature of the rubber and having a solubility of less than 5 cc. in one liter of water, is emulsified with 40–300 parts of water per 100 parts by volume of cement in the present of 0.5–2% by weight, based on the water, of an emulsifying agent, said agent comprising an alkali metal soap of a monocarboxylic acid having at least 12 carbon atoms per molecule and solvent is removed leaving a latex colloidally suspended in water, the steps comprising:

(a) heating the emulsion to form a foam of substantially all of the emulsion components in the substantial absence of flashing, said foam comprising vaporized solvent and liquid water containing colloidally dissolved emulsifying agent, and colloidally suspended rubber particles containing less than about 100 parts of solvent per 100 parts by weight of rubber;

(b) collapsing the foam by cooling whereby the vapors are liquified at the pressure employed, decanting the liquified solvent phase from the aqueous latex phase, said latex phase comprising water, colloidally dissolved emulsifier and colloidally dispersed rubber containing less than about 40 parts of solvent per 100 parts by weight of rubber and a slime comprising solvent containing colloidally suspended droplets, said droplets comprising a continuous water phase and partially stripped rubber particles containing a smaller proportion of solvent than in the original cement;

(c) passing the slime through a coalescer whereby it is resolved into a separate solvent phase and a latex phase containing rubber particles of solvent content substantially reduced from that of the original emulsion;

(d) and decanting solvent from latex.

2. A process according to claim 1 wherein the separated latex contains a minor proportion of the original rubber solvent and is subjected to a second stage sequence of foam formation, foam collapse, slime coalescence and phase separation.

3. A process according to claim 1 wherein the rubber is predominantly cis 1,4-polyisoprene, the solvent predominates in amylenes and the soap is a potassium soap of rosin acids.

References Cited by the Examiner
UNITED STATES PATENTS

| | | | |
|---|---|---|---|
| 2,799,662 | 7/1957 | Ernst et al. | 260—29.7 |
| 2,803,623 | 8/1957 | Anderson | 260—84.7 |
| 2,947,715 | 8/1960 | Charlet et al. | 260—29.7 |
| 3,003,930 | 10/1961 | Pugh et al. | 202—46 |

SAMUEL H. BLECH, *Primary Examiner.*

LOUISE P. QUAST, MURRAY TILLMAN, *Examiners.*

J. ZIEGLER, *Assistant Examiner.*